United States Patent [19]

Sordello et al.

[11] 3,864,740

[45] Feb. 4, 1975

[54] TRACK FOLLOWING SERVO SYSTEM

[75] Inventors: Frank J. Sordello, Los Gatos; John Cuda, San Jose, both of Calif.

[73] Assignee: Information Storage Systems, Inc., Cupertino, Calif.

[22] Filed: Nov. 5, 1973

[21] Appl. No.: 412,675

[52] U.S. Cl. .................................... 360/77, 360/27

[51] Int. Cl. ......................... G11b 21/10, G11b 5/02

[58] Field of Search ............. 360/77, 72, 22, 26, 70, 360/27; 318/560

[56] References Cited

UNITED STATES PATENTS 3,404,392 10/1968 Sordello ................................ 360/77

3,474,432 10/1969 Sevilla .................................. 360/77

*Primary Examiner*—James W. Moffitt

*Assistant Examiner*—Jay P. Lucas

*Attorney, Agent, or Firm*—Gerald L. Moore

[57] ABSTRACT

A servo system for accurately positioning a transducer relative to a recording medium by detecting equal amplitude signals from two adjacent servo tracks. The servo tracks are prerecorded on the medium and have a frequency difference which is small in comparison to the frequency of the signals themselves and by multiplying the resultant servo signal with signals at the frequencies contained in the servo signal, a resultant signal is generated which is suitable for controlling the servo system.

5 Claims, 1 Drawing Figure

TRACK FOLLOWING SERVO SYSTEM

BACKGROUND OF THE INVENTION

In random access recording systems, it is necessary to position a transducer at a desired data track on a recording medium with great precision since the present technology calls for the data track to be 5 milli-inches or less in thickness and the data tracks themselves to be no more than 5 milli-inches in width. In such data systems, as for instance in disc-type random access magnetic recorders, data is recorded in concentric circular tracks on the surfaces of discs with the transducer being translated radially for positioning above the data tracks. Prior to the time when the data tracks were made smaller such that more data could be recorded in a given medium, the transducer was usually positioned by use of some type of mechanical controlling means tied in with the transducer positioner. With the advent of the closer recorded data tracks, it has been found that the mechanical controlling means is no longer satisfactory due to tolerances within the system. For instance, in disc-type recording, the disc packs are removable and the mechanical tolerances within the system have required improvements in the servo system for accurate positioning of the transducer.

Accordingly there has developed the "track following" method of detecting the transducer position. In such a system prerecorded tracks are positioned on a recording medium which enables the direct detection of the position of the transducer relative to the medium. For instance U.S. Pat. No. 3,404,392, *Magnetic Track Following Servo System*, F. J. Sordello, issued on Oct. 1, 1968, discloses one example of a track following servo system. In this example, two frequencies are chosen to form servo tracks to either side of data tracks and the frequencies are separated by electronic filtering to generate a servo signal. It is imperative in this example that the frequency difference between the two servo tracks be sufficiently great to permit effective electronic filtering for separating the signals since the transducer reads both tracking signals simultaneously. Additionally, one must assure that one frequency is not the harmonic of the other or other obvious problems arise in separating the signals.

However, when the frequencies are sufficiently different to permit electronic filter separation, there exists the probability that the signals will be attenuated by factors other than the proximity to the data track. In other words, the transducer normally reads a signal which has a magnitude directly proportional to the lateral distance between the transducer and the servo track which signal enables the servo system to determine and position the transducer at the null point between the tracks. If other factors attenuate the servo frequency amplitude and a resulting erroneous signal is fed to the servo system, an erroneous positioning of the transducer follows which can cause movement of the transducer further from the null point.

There are a number of reasons why attenuation of the signal can result when the frequency of the servo tracks varies considerably. The causes involve such factors as (1) the recording characteristics of the head changes with frequency and therefore the magnitude of the signal from the recorded tracks varies with frequency; (2) the flying height of the head varies and as a result the two signals are attenuated at rates varying with frequency; (3) the readback characteristics of the read/-write head are different for the two frequencies; (4) the magnetic characteristics of the recording medium change with frequency; (5) the electronic characteristics of the circuit change with frequency; and (6) changes in the relative speed between the recording medium and the head can alter the frequency of the readout signal sufficiently to detune the electronic filters which are frequency dependent.

Thus it has been found that by using servo signals which differ by a wide frequency range, the servo system may not function at a high efficiency. It is therefore the object of this invention to provide a track following servo system which minimizes such problems encountered with previous systems.

Summary of the Invention

A servo system including means for positioning a transducer on a storage medium for reading information from the medium, first and second servo tracks for marking the position of each data track with the servo tracks being of different but similar frequencies, and a pair of circuits for receiving the transducer signals responsive to a read-back head detecting said servo tracks including means to modulate or multiply the transducer signal in each circuit, respectively, with modulating signals equal in frequency to that of the first and second servo track waveforms to generate a signal equal to the difference in frequency between the original servo track signal and the modulating signal for each circuit, and means to detect the magnitude of the resultant difference signal to generate a pair of servo signals for regulating the servo positioning means.

Description of the Invention

Figure 1:
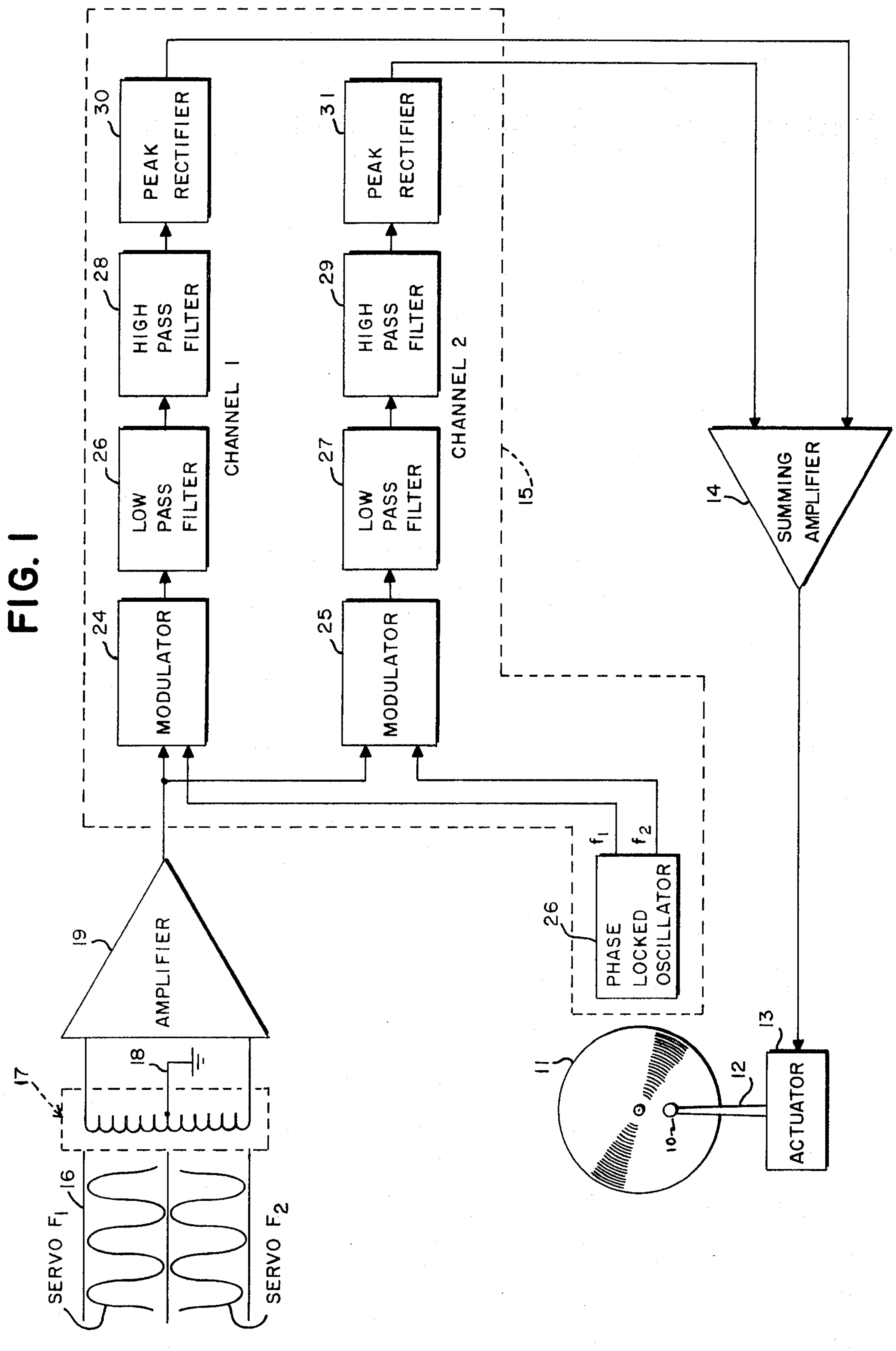
FIG. 1 is a circuit diagram and schematic showing the circuit of the present invention.

In FIG. 1 is shown a transducer 10 which can be moved radially across the surface of a recording medium or rotating disc 11 for the purpose of recording and reading data on a magnetic surface or coating (now shown) on the disc. The transducer is fixed to an arm 12 which is positioned by an actuator 13. Thus by proper energization of the actuator the arm is moved in a direction parallel to the surface or laterally of the disc 11 for positioning the transducer in the general area of preselected recording positions. Energization of the actuator 13 is provided by a summing amplifier 14 acting in response to a signal received from a servo system 15.

Usually there are a plurality of rotating discs similar to the disc 11 fixed to rotate in unison about the same axis. For each disc surface there is a transducer adapted to record and read information. In such apparatus all the transducers are mounted for movement together by the actuator 13. The one transducer 10 and the surface of disc 11 are dedicated to providing servo signals for positioning all the transducers relative to their cooperating disc surfaces. While the apparatus just described (but not shown in the drawing) is not necessary for the operation of the present invention, it is the preferred embodiments in today's technology.

The servo track or preselected position 16 is defined by the adjacent recorded cyclic waveforms $F_1$ and $F_2$ represented in schematic form in the drawing and recorded and read back from the disc surface by the transducer 10. The transducer includes a coil 17 connected to a wide band amplifier 19 and a center tap connection 18. By magnetic interaction between the coil and the magnetically recorded waveforms on the disc surface, a servo signal is generated in the coil responsive to the waveforms on the disc magnetic material. These signals include the cyclic signals produced by the sum of the signals $F_1$ and $F_2$ locating the track. The servo tracks are recorded in concentric circles on the disc surface along paths approximately 5 milli-inches or less in width. Because of the small size of the servo tracks and the small distance between adjacent servo tracks the transducer must be positioned with precision for the proper recording and reading of information data recorded on the other disc surface (not shown). It is for this purpose that the subject invention is provided.

In accordance with the present invention there is provided a servo system for accurately detecting the relative position between a transducer and a recording medium and in which a servo track is marked by prerecorded waveforms, one to each side of the track, such waveforms being of similar but different frequencies and spaced so that when the transducer is positioned near the track a servo signal responsive to each waveform and indicative of the transducer position will be read. Circuit means are provided to modulate the signal to generate a difference signal resulting when the modulating signal and each servo waveform signal are multiplied and to detect the amplitude of each difference signal thereby sensing the relative position of the transducer and the data track. By transmitting this difference signal to the summing amplifier 14 the actuator can be properly energized to move the head to a position over the data track.

Accordingly, the waveforms $F_1$ and $F_2$ are of different but similar frequencies and the modulators 24 and 25 of standard design are utilized to provide signal inputs to first and second channels or circuits respectively by receiving the transducer signal from the amplifier 19 resulting from the addition of waveforms $F_1$ and $F_2$. A modulating signal from a phase locked oscillator 26 is provided to generate first and second signals $f_1$ and $f_2$ of equal magnitude and preferably near but not necessarily exactly corresponding to the frequencies of the servo signals $F_1$ and $F_2$ originally recorded to mark the data track. In the preferred embodiment the phase locked oscillator is locked to the rotation of the disc 11, therefore changes in speed in the disc 11 which otherwise might result in a frequency change in the servo signals $f_1$ and $f_2$ will also cause a corresponding change in the signals $F_1$ and $F_2$ to cancel out any effect on the servo system. Thus there remains the function of separating the servo signals $F_1$ and $F_2$ thereafter detecting the amplitude of each signal for proper control of the servo system. The relative amplitude of each servo signal $F_1$ and $F_2$ indicates the direction by which the present transducer position differs from the desired position at the null point between the servo tracks, i.e., the signal $F_1$ or $F_2$ that is of the greatest amplitude denotes that the offset of the transducer from the null point is in the direction of that prerecorded waveform. Thus by feeding the total transducer signal to the modulator 24 along with a frequency signal $f1$, the transducer signal is modulated such that there results from the modulator, resultant signals equal to twice the servo frequency $F_1$ or $(F_1 + f_1)$, a signal $f_1$ plus $F_2$, a signal $f_1$ minus $F_2$, and a signal of a DC level (or $F_1 - f_1$). The mathematical derivation of these signals is included later.

In accordance with the invention, the difference between the two signals $f_1 - F_2$ is used as the servo signal. This choice is made since the signals resulting as the sums of the signals $[(f_1 + F_1)]$ and $[(f_1 + F_{2,})]$ are very close together in frequency and therefore difficult to separate by filtering. The DC component of the signal is not predictable because the amplitude may change greatly as the frequency of the oscillator changes and there is no predicting the phase relationship between the signals fed to the modulator, which phase relationship can also affect the level of the DC signal.

The arithmetic derivation of the signals is as follows: The two servo waveforms being $f_1$ and $f_2$, i.e., equal to the modulating frequency, the transducer readback signal equals:

1. $[A_1 \text{ Cos } (2\pi f_1 t) + A_2 \text{ Cos } (2\pi f_2 t] \; (K \text{ Cos } 2\pi f_1 t)$ - Channel 1
2. $[A_1 \text{ Cos } (2\pi f_1 t) + A_2 \text{ Cos } (2\pi f_2 t] \; (K \text{ Cos } 2\pi f_2 t)$ - Channel 2

Where $A_1$ and $A_2$ are constants representing the amplitude of the servo signal components of $f_1$ and $f_2$ respectively.

K is constant representing the amplitude of the multiplying or modulating signal By assigning $W_, = 2\pi f_1$ and $W_2 = 2\pi f_2$ the above statements reduce to:

1. $(KA_1/2) \text{ Cos } 2W_, t + (KA_1/2) + (KA_2/2) \text{ Cos } (W_2 + W_1)t + (KA_2/2) \text{ Cos } (W_2 - W_1)t$
2. $(KA_1/2) \text{ Cos } (W_2 + W_1)t + KA_1/2 \text{ Cos } (W_1 - W_2)t + KA_2/2 \text{ Cos } 2W_2 t + KA_2/2$ For each channel there results signals with frequencies equal to:

1. $2f_1, f_1 - f_2, f_1 + f_2$, & a DC or low frequency term equal to $f_1 - F_1$ if $f_1 \neq F_1$
2. $2f_2, f_2 - f_1, f_2 + f_1$, & a DC or low frequency term equal to $f_2 - F_2$ if $f_2 \neq F_2$ Thus to separate out the difference signal in the first circuit responsive to $f_1$ minus $f_2$ the lowpass filter 26 is utilized to filter from the signal the higher frequency signals responsive to the sum of the frequencies and the highpass filter 28 is utilized to filter the DC component from the signal.

In the same manner the second circuit including the modulator 25 includes a lowpass filter 27 and a highpass filter 29 for filtering out the DC and the sum of the frequencies components of the signal leaving the difference signal.

Thereafter by use of the standard peak detectors 30 and 31 in the first and second circuits respectively, the amplitude of the difference signals representing $f_1 - f_2$ and $f_2 - f_1$, respectively, for each circuit can be detected which signals are indicative of the amplitude of the original modulated servo signals $F_1$ and $F_2$ as detected by the transducer. The amplitude of the signals at the output of the summing amplifier 19 as was pointed out heretofore, represents not only the direction in which the transducer is offset from the null point or center of the data track but also indicates the degree to which the transducer position varies from the null point because of the relative amplitudes of the signals are modulated primarily with the lateral displacement of the transducer from each servo signal. Thus by peak detecting each of the difference signals a signal level can be detected which is fed to the summing amplifier 14 and which signal further is responsive to the position of the transducer. By use of these signals the actuator 13 can be energized in a manner to move the transducer to a position centered over the data track.

We claim:

1. A servo system for positioning a transducer relative to a storage medium to read information stored on the medium, said system comprising:

positioning means energizeable for moving the transducer laterally to preselected recording positions relative to the storage medium, means to effect relative movement between the storage medium and the transducer thereby to enable the transfer of information between the medium and transducer, a plurality of side-by-side closely-spaced first and second servo waveforms recorded on the medium such that a pair of first and second servo waveforms identifies a preselected position on the medium and wherein the first and second waveforms are at different but similar cyclic frequencies whereby movement of the transducer to a position near said preselected position will enable the transducer to generate a position signal resulting from reading both servo waveform signals with the magnitude of such position signal being indicative of the lateral position of the transducer relative to that servo waveform, first and second channels receiving the position signal from the transducer and each including modulators capable of mixing cyclic signals, means to supply to the first and second channel modulators, first and second modulating signals respectively having frequencies similar to the frequencies of the first and second servo waveforms respectively to generate a difference signal resulting by the subtraction of the position signal and the modulating signal in each channel with each difference signal having a magnitude indicative to the relative position of the transducer to one servo waveform, means to detect the difference signal in each channel, and means to energize the positioning means responsive to the magnitudes of the difference signals thereby to move the transducer towards the preselected position between the servo waveforms.

2. A servo system for positioning a transducer relative to a storage medium to read information stores in the medium, said system comprising:

positioning means energizeable for moving the transducer laterally to preselected positions relative to the storage medium, means to effect relative movement between the storage medium and the transducer thereby to enable the transfer of information between the medium and transducer, a plurality of side-by-side closely-spaced servo waveforms recorded on the medium such that a pair of waveforms identifies a preselected position in the medium and wherein each pair of waveforms are at different cyclic frequencies whereby movement of the transducer to a position near said preselected position will enable the transducer to generate a position signal including both servo waveform signals with the magnitude of the signals resulting from detection of the different servo waveforms being indicative of the lateral position of the transducer relative to the respective waveform, first and second channels adapted to receive the position signal from the transducer and each including modulators capable of mixing cyclic signals, means to supply to the first channel a modulating signal similar in frequency to that of one cyclic waveform and to the second channel a second modulating signal similar in frequency to that of the other cyclic waveform of the preselected recording position, whereby the modulator of each channel will generate a plurality of resultant frequency signals to include a difference signal equal in frequency to the difference between the modulating signal supplied to the modulator and the cyclic waveform signal of different frequency than the modulating signal with each difference signal having an amplitude responsive to the relative position of the transducer and that servo waveform, means in each channel to filter the difference signal from the other resultant frequency signals thereby leaving in each channel a difference signal having a magnitude indicative of the magnitude of one of the cyclic waveform signals of the preselected position near which the transducer is positioned, and means to energize the positioning means responsive to the magnitude of the two difference signals thereby to center the transducer relative to the preselected recording position.

3. A servo system as defined in claim 2 including means to vary the frequency of the modulating signal responsive to changes in the speed of the relative movement between the transducer and the medium.

4. A servo system as defined in claim 2 wherein the modulating signal is supplied by a phase-locked oscillator operable to generate the modulating signal in response to the speed of relative movement between the transducer and the storage medium.

5. A servo system for positioning a transducer on a storage medium to read information from the medium comprising:

means to effect relative lateral movement between the medium and the transducer thereby to enable the reading of data from the medium, positioning means energizeable for moving the transducer to preselected positions on the medium, said medium including a plurality of servo tracks recorded thereon, said tracks comprising a first and second recorded cyclic waveform signal positioned to each side thereof with the cyclic waveform signal on one side being of a similar but different frequency than the cyclic waveform signal on the other side of the data track, a transducer capable of generating a signal responsive to the reading simultaneously of the cyclic signals of two juxtaposed cyclic waveforms of a preselected position near which the transducer is positioned, first and second circuit means for modulating said transducer signal, means to supply to the first circuit a modulating signal equal to said first cyclic waveform signal and to supply to the second circuit a modulating signal equal to said second cyclic waveform signal for modulating said transducer signal, means to detect the difference signal between the transducer signal and the first and second cyclic signal in said first and second circuit means respectively, means to compare the magnitude of the difference signals from said first and second signals for generating a servo signal, and means for energizing the positioning means with the servo signal for moving the transducer laterally toward the preselected position.

* * * * *